United States Patent

Suita et al.

(10) Patent No.: US 7,637,021 B2
(45) Date of Patent: Dec. 29, 2009

(54) APPARATUS AND METHOD FOR POSITIONING A VEHICLE

(75) Inventors: Kazutsugu Suita, Nagoya (JP); Keiichiro Fujita, Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/988,168

(22) PCT Filed: Mar. 13, 2007

(86) PCT No.: PCT/JP2007/055590

§ 371 (c)(1),
(2), (4) Date: Apr. 8, 2008

(87) PCT Pub. No.: WO2007/125693

PCT Pub. Date: Nov. 8, 2007

(65) Prior Publication Data

US 2009/0126208 A1 May 21, 2009

(30) Foreign Application Priority Data

Apr. 24, 2006 (JP) .............................. 2006-119734

(51) Int. Cl.
*G01B 21/26* (2006.01)
(52) U.S. Cl. ................ 33/203.12; 33/203.15; 33/203.18
(58) Field of Classification Search ............. 33/203.12, 33/203.13, 203.15, 203.18; 73/114, 123
See application file for complete search history.

(56) References Cited

U.S. PATENT DOCUMENTS

| | | | |
|---|---|---|---|
| 4,443,951 A * | 4/1984 | Elsasser et al. | 33/203.13 |
| 4,679,327 A * | 7/1987 | Fouchey et al. | 33/203.13 |
| 5,040,303 A * | 8/1991 | Koerner | 33/286 |
| 5,088,320 A * | 2/1992 | Fukuda et al. | 33/203.13 |
| 6,070,332 A * | 6/2000 | Kane | 33/203.13 |
| 6,195,900 B1 * | 3/2001 | Boess | 33/203.13 |
| 6,256,894 B1 * | 7/2001 | Naruse et al. | 33/203.12 |
| 6,564,461 B1 * | 5/2003 | Naruse | 33/203 |
| 7,100,290 B2 * | 9/2006 | Hara et al. | 33/203.13 |
| 7,318,340 B2 * | 1/2008 | Suita | 73/123 |
| 7,415,770 B2 * | 8/2008 | Naruse | 33/203.13 |

(Continued)

FOREIGN PATENT DOCUMENTS

EP 0 977 010 A2 2/2000

(Continued)

*Primary Examiner*—Yaritza Guadalupe-McCall
(74) *Attorney, Agent, or Firm*—Kenyon & Kenyon LLP

(57) ABSTRACT

The invention provides a vehicle confronting apparatus and a vehicle confronting method for a vehicle, which enables to confront a vehicle surely for a short while. A vehicle confronting apparatus 1, comprises: a guide-type confronting device 2 guiding a wheel of a vehicle 7 entering to a confronting position, and regulating both sides of the wheel of the vehicle; a run-out-type confronting device 4 rotationally driving the wheel of the vehicle reaching the confronting position; and a control device 6 controlling motions of the guide-type confronting device 2 and the run-out-type confronting device 4. The control device 6 cancels the regulation of the wheel by the guide-type confronting device 2 within a period between a time of starting of the rotational driving of the wheel of the vehicle 7 and a time when the rotation speed of the wheel reaches a predetermined run-out speed.

4 Claims, 10 Drawing Sheets

U.S. PATENT DOCUMENTS

| | | | |
|---|---|---|---|
| 2002/0144414 A1* | 10/2002 | Jackson et al. | 33/203.12 |
| 2004/0134080 A1* | 7/2004 | Hara et al. | 33/203.13 |
| 2006/0102408 A1* | 5/2006 | Suita | 180/233 |

FOREIGN PATENT DOCUMENTS

| | | |
|---|---|---|
| EP | 1 655 593 A2 | 5/2006 |
| GB | 2 404 259 B | 2/2006 |
| JP | 06-331505 A | 12/1994 |
| JP | 2003-004595 A | 1/2003 |

* cited by examiner

APPARATUS AND METHOD FOR POSITIONING A VEHICLE

TECHNICAL FIELD

This invention relates to a vehicle confronting apparatus and a confronting method for a vehicle.

BACKGROUND ART

Conventionally, as disclosed in JP, H06-331505, A, there is a well-known vehicle confronting apparatus that arranges a vehicle at a predetermined position and into a predetermined direction (posture). This device is used for various purposes, such as evaluation about whether or not the direction of (direction of an optical axis of) headlights of the vehicle or a backing guide monitor of the vehicle is proper, or about whether or not the alignment of wheels of the vehicle is proper.

The vehicle confronting apparatus described in JP, H06-331505, A, confronts the vehicle by moving a target vehicle onto the table, and by pushing side surfaces of the wheels of the vehicle so as to move the vehicle in the transversal direction.

However, since the vehicle confronting apparatus described in JP, H06-331505, A moves the vehicle by pushing the side surfaces of the wheels of the vehicle, elastic deformation remains in the wheels of the vehicle and hysteresis remains in an undercarriage (such as suspensions) of the vehicle after the vehicle reaches the confronting position.

Therefore, the confronting of the vehicle at the confronting position is not reflected on the actual traveling state of the vehicle, thereby reducing the reliability of the above-mentioned various evaluations based on the confronting.

Moreover, there is another well-known vehicle confronting apparatus which is named as a run-out-type confronting apparatus. As to this apparatus, the elastic deformation remaining in the wheels and hysteresis remaining in an undercarriage of the vehicle are removed while the wheels are supported and are driven rotationally.

However, as to the conventional run-out-type confronting apparatus, the vehicle entered in the apparatus may be deviated from the desired confronting position. In this case, it takes a long time to move the vehicle to the confronting position while removing the elastic deformation remaining in the wheels and hysteresis remaining in the undercarriage of the vehicle, thereby reducing workability (productivity).

Moreover, as another problem, the run-out-type confronting apparatus, especially the wheel-supporting portion thereof for supporting the wheels, is enlarged, since the supporting members supporting wheels have to be large in the transversal direction enough to completely remove the lateral forces of the wheels (the forces of the wheels for pushing the ground sidewise) while the wheels of the vehicle are rotationally driven on the apparatus for a long time.

In addition, the enlargement of the wheel-supporting parts of the confronting apparatus increases the weight thereof. As a result, the lateral force may be insufficient to correspond to the weight of the supporting parts, so that it is difficult to remove the lateral force.

DISCLOSURE OF INVENTION

In consideration of the above-mentioned problems, the present invention is intended to provide a vehicle confronting apparatus and a confronting method for a vehicle so as to confront the vehicle surely for a short while.

The above-mentioned problems are solved by the following means according to the present invention.

According to the present invention, a vehicle confronting apparatus comprises: a guide-type confronting device guiding a wheel of a vehicle entering to a confronting position, and regulating both sides of the wheel of the vehicle; a run-out-type confronting device rotationally driving the wheel of the vehicle reaching the confronting position; and a control device controlling motions of the guide-type confronting device and the run-out-type confronting device. The control device cancels the regulation of the wheel by the guide-type confronting device within a period between a time of starting of the rotational driving of the wheel of the vehicle and a time when the rotation speed of the wheel reaches a predetermined run-out speed.

According to the present invention, the run-out-type confronting device comprises: a rotate means abutting against the wheel of the vehicle so as to rotationally drive the wheel; a support means supporting the rotation means movably in longitudinal and crosswise directions and turnably; a longitudinal move-restraining means to restrict the longitudinal moving of the rotate means, or to cancel the restriction; a crosswise move-restraining means to restrict the crosswise moving of the rotate means, or to cancel the restriction; and a turn-restraining means to restrict the turning of the rotation means, or to cancel the restriction. The control device cancels the restriction of the longitudinal moving of the rotation means by the longitudinal move-restraining means before the rotational driving of the wheel of the vehicle by the run-out-type confronting device is started. The control device cancels the restriction of the crosswise moving of the rotation means by the crosswise move-restraining means and the restriction of the turning of the rotation means by the turn-restraining means after the restriction of the wheel by the guide-type confronting device is canceled.

According to the present invention, a confronting method for a vehicle comprises: a vehicle entering process guiding a wheel of the vehicle, and entering the vehicle to a confronting position; a wheel restriction process regulating both sides of the wheel of the vehicle reaching the confronting position; and a run-out process rotationally driving the wheel of the vehicle reaching the confronting position, During the run-out process, the restriction of the wheel is canceled within a period between a time of starting of the rotational driving of the wheel of the vehicle and a time when the rotation speed of the wheel reaches a predetermined run-out speed.

According to the present invention, the run-out process is performed using a run-out-type confronting device. The run-out-type confronting device comprises: a rotation means abutting against the wheel of the vehicle so as to rotationally drive the wheel; a support means supporting the rotation means movably in longitudinal and crosswise directions and turnably; a longitudinal move-restraining means to restrict the longitudinal moving of the rotation means, or to cancel the restriction; a crosswise move-restraining means to restrict the crosswise moving of the rotation means, or to cancel the restriction; and a turn-restraining means to restrict the turning of the rotation means, or to cancel the restriction. The restriction of the longitudinal moving of the rotation means by the longitudinal move-restraining means is canceled before the rotational driving of the wheel of the vehicle by the run-out-type confronting device. The restriction of the crosswise moving of the rotation means by the crosswise move-restraining means and the restriction of the turning of the rotation means by the turn-restraining means after the restriction of the wheel by the guide-type confronting device is canceled.

Accordingly, since the wheel is regulated by the guide-type confronting device and is placed in the confronting position for a while after starting the rotational driving of the wheel, it takes a short time to place the vehicle at the confronting position, under the situation that the elastic deformation remaining in the wheel and the hysteresis remaining in base carriers of the vehicle are removed. That is, the vehicle can be confronted surely for a short while.

BEST MODE FOR CARRYING OUT THE INVENTION

A vehicle confronting apparatus 1, serving as one of embodiments of the invention, is descried as follows by referring FIG. 1 to FIG. 10.

Figure 1:
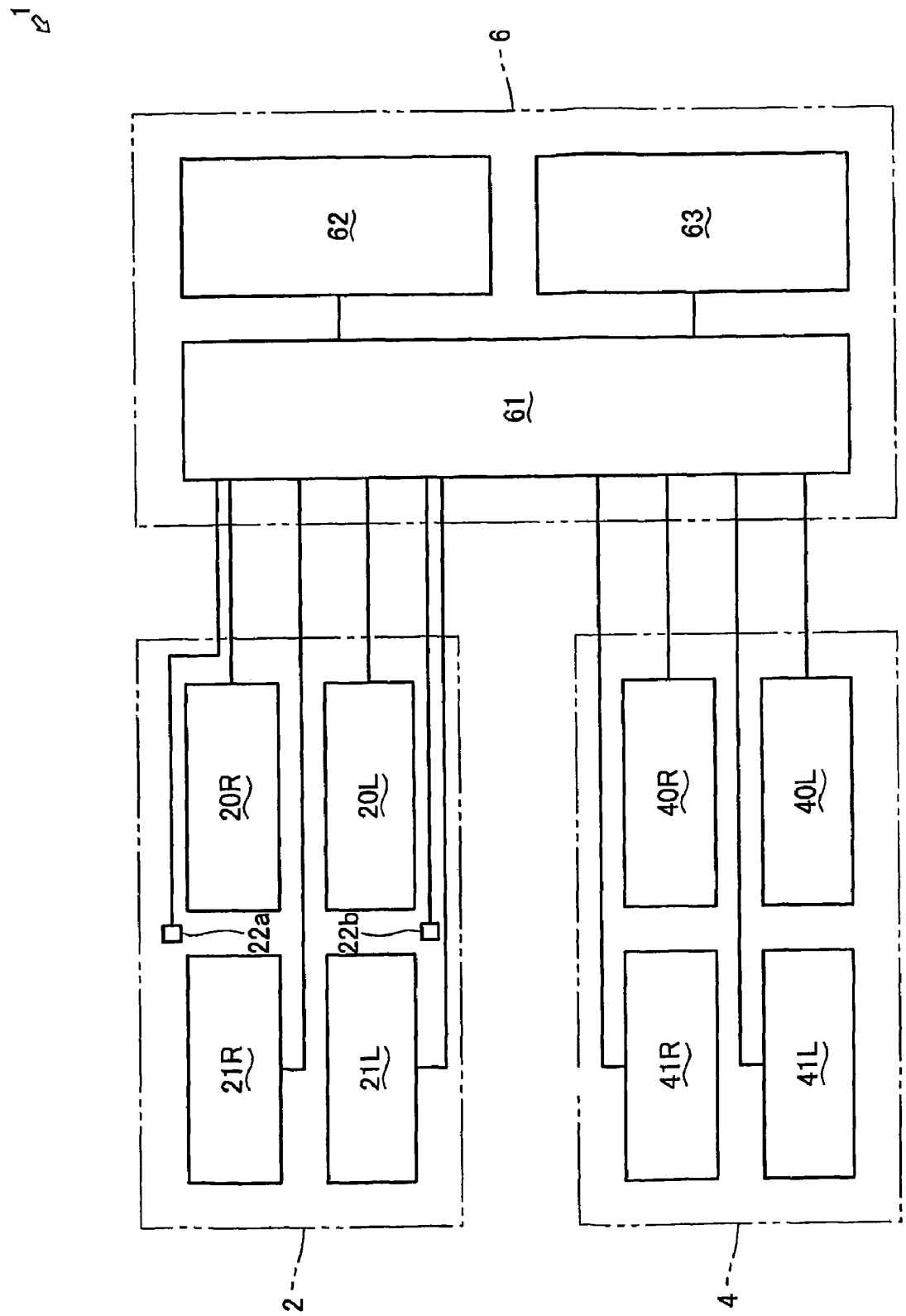
FIG. 1 is a block diagram view of a vehicle confronting apparatus according to an embodiment of the invention.

As shown in FIG. 1, the vehicle confronting apparatus 1 is a device for confronting a passenger car 7, and mainly has a guide-type confronting device 2, a run-out-type confronting device 4, and a control device 6.

Figure 2:
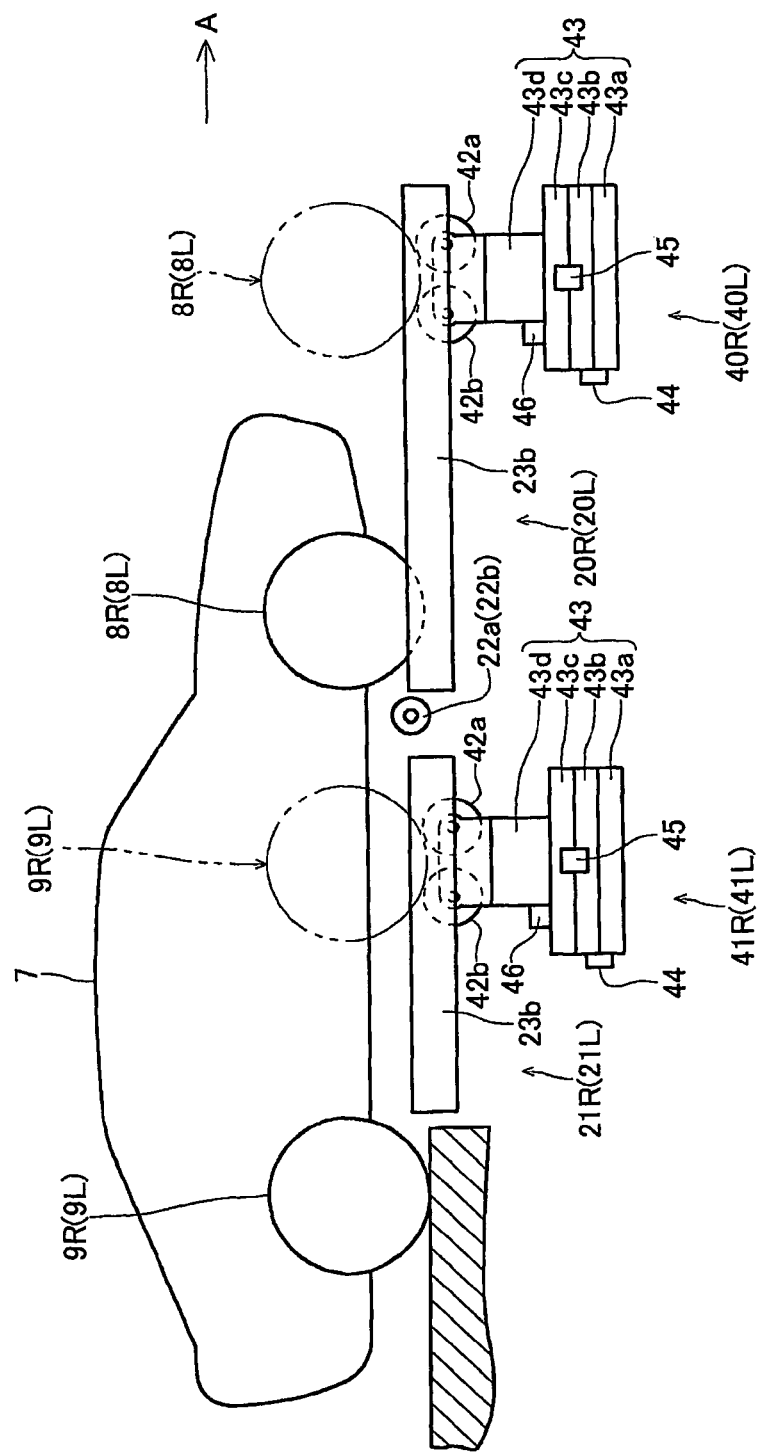
FIG. 2 is a side view of a principal portion of the vehicle confronting apparatus according to the embodiment of the invention.
Figure 3:
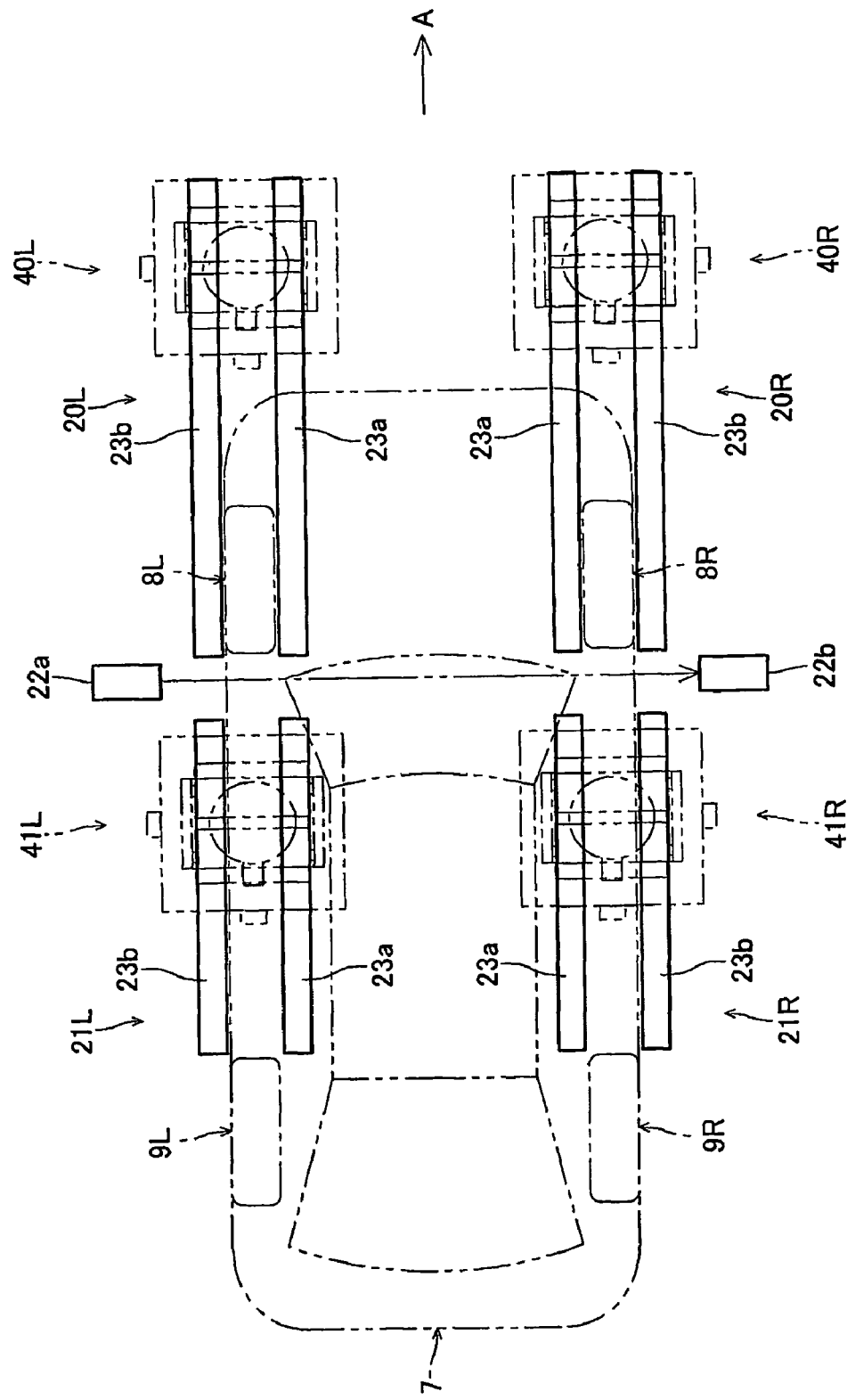
FIG. 3 is a plan view of the principal portion of the vehicle confronting apparatus according to the embodiment of the invention.
Figure 4:
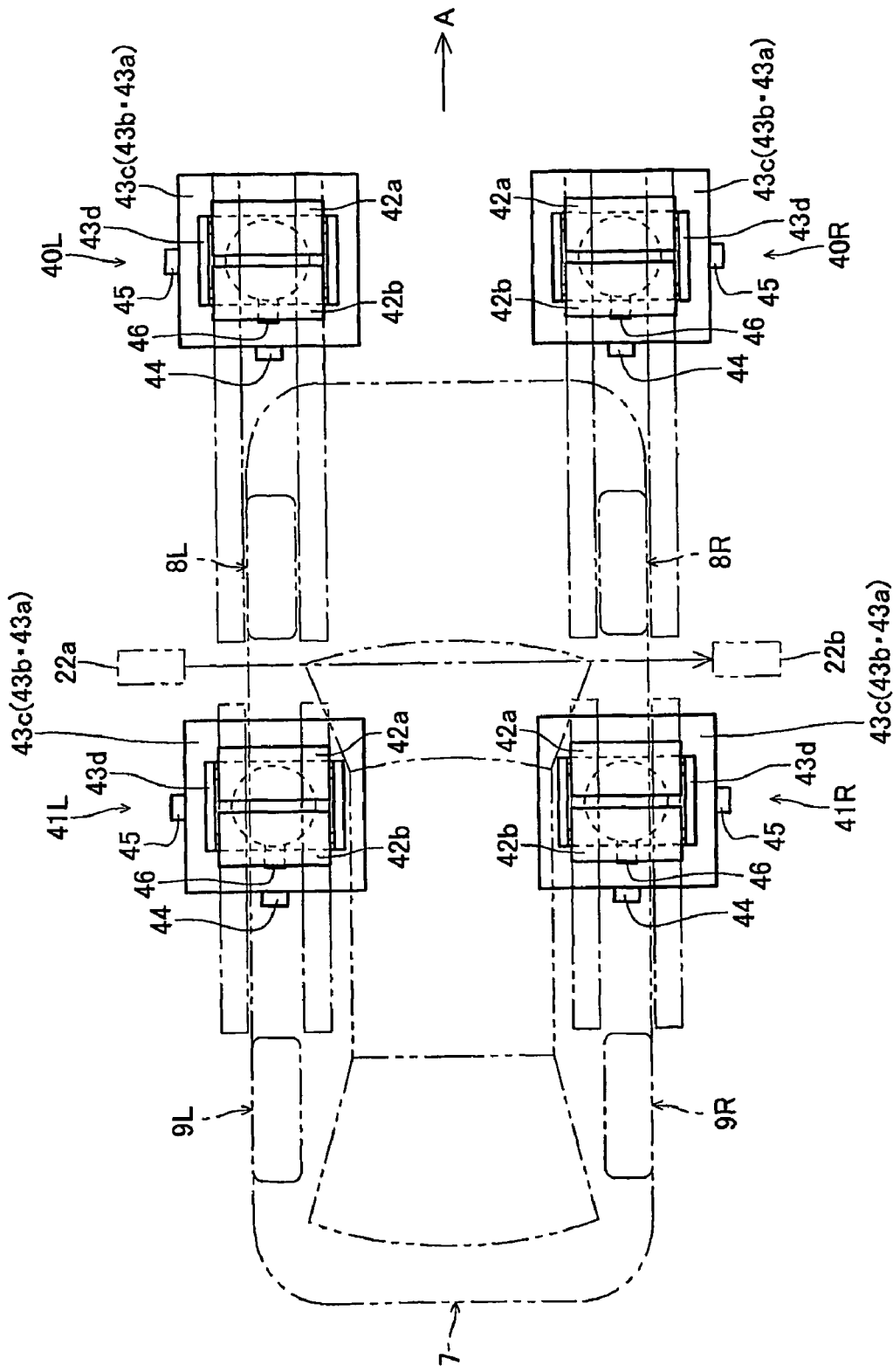
FIG. 4 is a plan view of the principal portion of the vehicle confronting apparatus according to the embodiment of the invention.

As shown in FIG. 2 to FIG. 4, the passenger car 7 serving as one of embodiments of the vehicle employing this invention has a right front wheel 8R, a left front wheel 8L, a right rear wheel 9R, and a left rear wheel 9L.

The "Vehicle" according to this invention includes not only a passenger car but also any travelable vehicles having wheels, such as a track, a trailer or various work vehicles. Therefore, it is not limited to the passenger car 7 of this embodiment.

"To confront the vehicle" means that the vehicle is arranged at a prescribed position (confronting position) and in a prescribed direction (posture).

Further, the confronting position of the vehicle confronting apparatus 1 according to this embodiment is defined as the position where the right front wheel 8R, the left front wheel 8L, the right rear wheel 9R, and the left rear wheel 9L are disposed as drawn in two-dot chain lines in FIG. 2.

In the following, the guide-type confronting device 2 is described by referring FIG. 1 to FIG. 5.

The guide-type confronting device 2, serving as one of embodiments of the guide-type confronting device of this invention, guides each of the right front wheel 8R, the left front wheel 8L, the right rear wheel 9R, and left rear wheel 9L of the passenger car 7 entering the confronting position, and regulates both sides of each of the right front wheel 8R, the left front wheel 8L, the right rear wheel 9R, and left rear wheel 9L of the passenger car 7 reaching the confronting position.

As shown in FIG. 1, the guide-type confronting device 2 mainly has guide-type confronting units 20R, 20L, 21R, 21L, and sensors 22a, 22b for detecting a passing of the front wheels.

In the following, the guide-type confronting unit 20R is described by referring FIG. 5.

Incidentally, description of the guide-type confronting units 20L, 21R and 21L is omitted because the guide-type confronting units 20R, 20L, 21R, and 21L correspond to the right front wheel 8R, the left front wheel 8L, the right rear wheel 9R, and the left rear wheel 9L of the passenger car 7, respectively, and have the basically same construction.

The guide-type confronting unit 20R guides the right front wheel 8R of the passenger car 7 entering the confronting position, and regulates the right front wheel 8R of the passenger car 7 reached the confronting position.

The guide-type confronting unit 20R mainly has an inner guide mechanism and an outer guide mechanism. The inner guide mechanism has an inner guide member 23a, ball screws 24a, 24a, bevel gears 26a, 26a, a rotary shaft 27a, a gear 28a, a gear 29a, a motor 30a. The outer guide mechanism has an outer guide member 23b, ball screws 24b, 24b, bevel gears 26b, 26b, a rotary shaft 27b, a gear 28b, a gear 29b, a motor 30b.

In the following, the inner guide mechanism is described.

The inner guide member 23a is a cylindrical member extended in the entering direction of the passenger car 7 (direction of the arrow A). The inner guide member 23a is placed so as to face the inner surface of the right front wheel 8R of the passenger car 7 entering toward the confronting position.

Even if the right front wheel 8R is attempted to move to the inside of the inner guide member 23a, the inner surface of the wheel abutting on the inner guide member 23a prevents the wheel from moving to the inside of the member. That is, the right front wheel 8R is guided so as to move to the outside from the inner guide member 23a.

The ball screws 24a, 24a are threaded on outer peripheral surfaces thereof, and are screwed to the front and rear end portions of the inner guide member 23a, respectively. Each of the ball screws 24a, 24a is disposed so as to have an axis thereof oriented substantially in the transversal direction of the passenger car 7 entering toward the confronting position, and is supported by bearings (not illustrated).

Each of bevel gears 25a, 25a is disposed on one end of each of the bawl screws 24a, 24a. Each of the bevel gears 26a, 26a meshes with each of the bevel gears 25a, 25a.

The rotary shaft 27a is provided on opposite ends thereof with the bevel gears 26a, 26a, respectively, and the rotary shaft 27a is disposed so as to have an axis thereof oriented substantially in the entering direction of the passenger car 7, and is supported by bearings (not illustrated).

The gear 28a is a spur gear, which is disposed at middle part of the rotary shaft 27a. The gear 29a is a spur gear, which meshes with the gear 28a.

The motor 30a is a servomotor, and the amount of the rotation (rotation angle) of the output shaft thereof is controllable. The gear 29a is disposed on the output shaft of the motor 30a.

The ball screws 24a, 24a are rotated by rotationally driving the motor 30a, so that the inner guide member 23a, which meshes with the ball screws 24a, 24a, moves in the transversal direction of the passenger car 7 entering toward the confronting position In the following, the outer guide mechanism is described.

The outer guide member 23b is a cylindrical member extended in the entering direction of the passenger car 7 (direction of the arrow A). The outer guide member 23b is placed so as to face the outer surface of the right front wheel 8R of the passenger car 7 entering toward the confronting position.

Even if the right front wheel 8R is attempted to move to the outside of the outer guide member 23b, the outer surface of the wheel abutting on the outer guide member 23b prevents the wheel from moving to the outside of the member. That is, the right front wheel 8R is guided so as to move to the inside from the outer guide member 23b.

The ball screws 24b, 24b are threaded on outer peripheral surfaces thereof, and are screwed to the front and rear end portions of the outer guide member 23b, respectively. Each of the ball screws 24b, 24b is disposed so as to have an axis thereof oriented substantially in the transversal direction of the passenger car 7 entering toward the confronting position, and is supported by bearings (not illustrated).

Each of the bevel gears 25b, 25b is disposed on one end of each of the bawl screws 24b, 24b. Each of the bevel gears 26b, 26b meshes with each of the bevel gears 25b, 25b.

The rotary shaft 27b is provided on opposite ends thereof with the bevel gears 26b, 26b, respectively; and the rotary shaft 27b is disposed so as to have an axis thereof oriented substantially in the entering direction of the passenger car 7, and is supported by bearings (not illustrated).

The gear 28b is a spur gear, which is disposed on a middle part of the rotary shaft 27b. The gear 29b is a spur gear, which meshes with the gear 28b.

The motor 30b is a servomotor, and the amount of the rotation (rotation angle) of the output shaft thereof is controllable. The gear 29b is disposed on the output shaft of the motor 30b.

The ball screws 24b, 24b are rotated by rotationally driving the motor 30b, so that the outer guide member 23b, which meshes with the ball screws 24b, 24b, moves in the transversal direction of the passenger car 7 entering toward the confronting position By appropriately driving the motors 30a, 30b, the inner guide member 23a and the outer guide member 23b can be disposed so as to have respective prescribed spaces from the inner and outer surfaces of the right front wheel 8R of the passenger car 7 entering toward the confronting position, thereby guiding the right front wheel 8R. Moreover, after the passenger car 7 reaches the confronting position, the motors 30a, 30b are appropriately driven so as to narrow the interval between the inner guide member 23a and the outer guide member 23b, thereby regulating both sides of the right front wheel 8R.

Incidentally, "to regulate both sides of the wheel" means to restrict the movement of the wheel in the transversal direction (laterally) as far as possible while the wheel is allowed to rotate.

In this embodiment, the inner guide member 23a and outer guide member 23b are retained so as to have the interval therebetween which is a little larger than the width of the right front wheel 8R.

Figure 5:
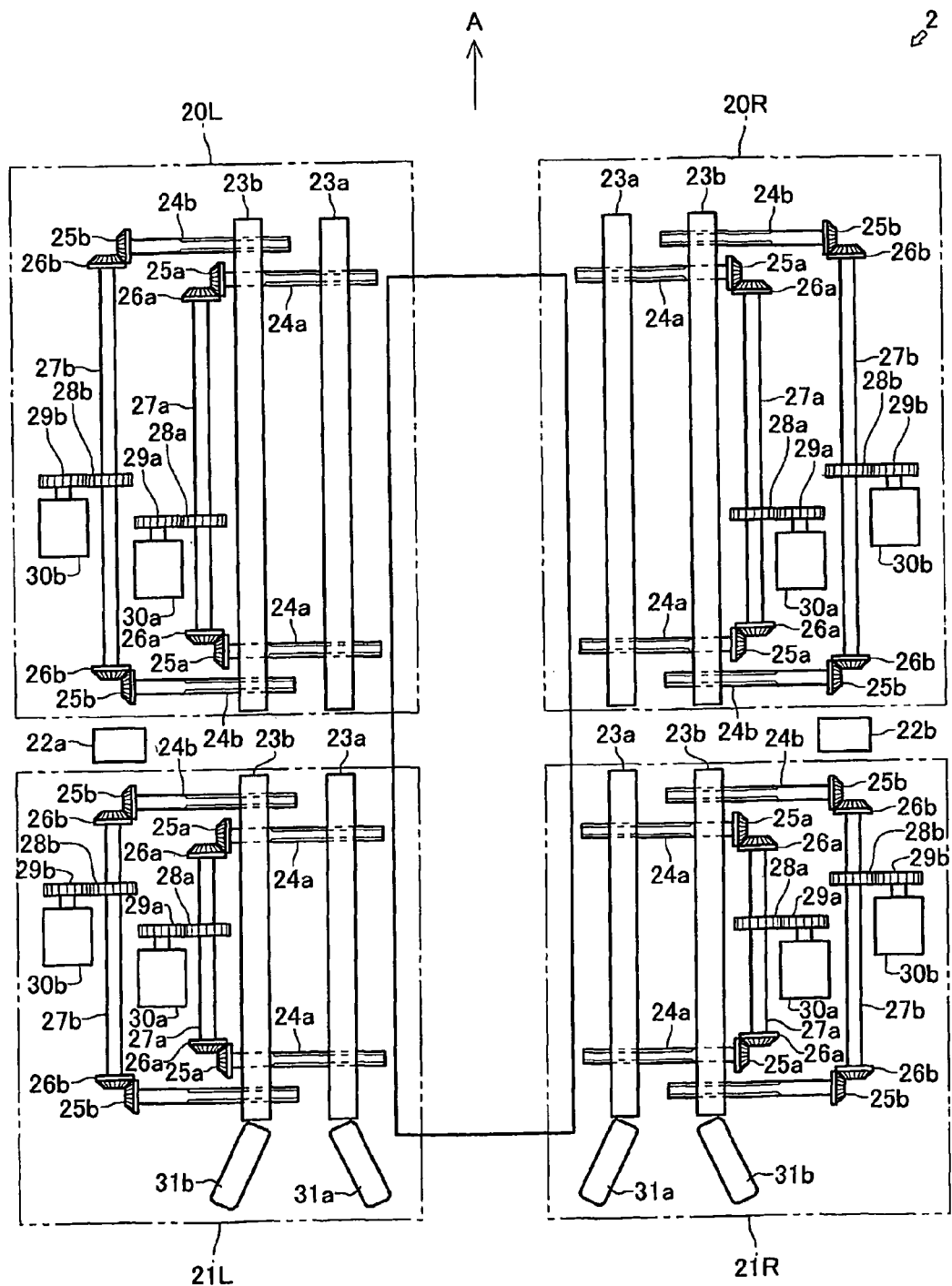
FIG. 5 is a plan view of a guide-type confronting device.

As shown in FIG. 5, a pair of guide members 31a, 31b are disposed rearwardly of the inner guide member 23a and outer guide member 23b of each of the guide-type confronting units 21R, 21L.

The pair of guide members 31a, 31b are members for easily guiding the wheels (the right front and rear wheels 8R and 9R, or the left front and rear wheels 8L and 9R) of the passenger car 7 entering toward the confronting position to the space between the inner guide member 23a and the outer guide member 23b of each of the guide-type confronting unit 21R, 21L. The pair of the guide members 31a, 31b are disposed at front ends thereof in the vicinity of the rear ends of the inner guide member 23a and the outer guide member 23b of each of the guide-type confronting units 21R, 21L, respectively, and the pair of guide members 31a, 31b are extended rearward so that rear ends thereof have a wider space therebetween (in a truncated chevron shape in plane view).

The sensors 22a, 22b for detecting a passing of the front wheels detect the right front wheel 8R and left front wheel 8L passing between the pair of guide-type confronting units 20R, 20L and the pair of guide-type confronting units 21L, 21R when the passenger car 7 enters the vehicle confronting apparatus 1 forward to the confronting position.

As shown in FIG. 2 to FIG. 4, the sensors 22a, 22b is disposed between the guide-type confronting units 20R, 20L and the guide-type confronting units 21L, 21R.

In this embodiment, the sensor 22a is a floodlight of an optical sensor, and irradiates (projects) infrared lasers toward the sensor 22b. The sensor 22b is a receiver of an optical sensor, and detects (receives) infrared lasers irradiated by the sensor 22a. The optical path irradiated by the sensor 22a is disposed so as to cross the passages of the right front wheel 8R and the left front wheel 8L of the passenger car 7 entering toward the confronting position.

The sensors 22a, 22b of this embodiment are composed of optical sensors. Alternatively, other compositions, such as a contact switch, an electrostatic capacity type sensor or the like, are adaptable for detecting the passing of the vehicle.

In the following, the run-out-type confronting device 4 is described by referring FIG. 1 to FIG. 4, and FIG. 6 and FIG. 7.

The run-out-type confronting device 4 is one of embodiments of the run-out-type confronting means, rotationally driving the right front wheel 8R, the left front wheel 8L, the right rear wheel 9R, and the left rear wheel 9L of the passenger car 7 reaching the confronting position, respectively.

As shown in FIG. 1, the run-out-type confronting device 4 mainly has run-out-type confronting units 40R, 40L, 41R, 41L.

In the following, the run-out-type confronting unit 40R is described specifically by referring FIG. 2 to FIG. 4, and FIG. 6 and FIG. 7.

Incidentally, description of the run-out-type confronting units 40L, 41R and 41L is omitted because the run-out-type confronting units 40R, 40L, 41R, and 41L correspond to the right front wheel 8R, the left front wheel 8L, the right rear wheel 9R, and the left rear wheel 9L of the passenger car 7, respectively, and have the basically same construction.

The run-out-type confronting unit 40R rotationally drives the right front wheel 8R of the passenger car 7 reaching the confronting position.

As shown in FIG. 2, the run-out-type confronting unit 40R mainly has rollers 42a, 42b, a table 43, a longitudinal move-restraining member 44, a crosswise move-restraining member 45, and a turn-restraining member 46.

The rollers 42a, 42b are one of embodiments of the rotate means of the invention, which abut against the right front wheel 8R of the passenger car 7 so as to rotationally drive the right front wheel 8R.

The rollers 42a, 42b are substantially columnar shaped members, and are rotatably supported by a fourth support member to be discussed later. The rollers 42a, 42b are disposed substantially in parallel to each other, and the roller 42a is disposed substantially ahead of the roller 42b.

The roller 42a abuts on the front-under area of the outer peripheral surface (surface to contact the ground) of the right front wheel 8R of the passenger car 7 reaching the confronting position, and the roller 42b abuts on the rear-under area of the outer peripheral surface (surface touching the ground) of the right front wheel 8R of the passenger car 7 reaching the confronting position. That is, the right front roller 8R of the passenger car 7 reaching the confronting position is fitted in the hollow formed at the gap between the rollers 42a, 42b.

The right front wheel 8R abutting on the rollers 42a, 42b is rotated when the rollers 42a, 42b are driven rotationally by a drive motor (not illustrated).

The table 43 is one of embodiments of the support means of the invention, which supports the rollers 42a, 42b movably in longitudinal and crosswise directions, and turnably.

Figure 6:
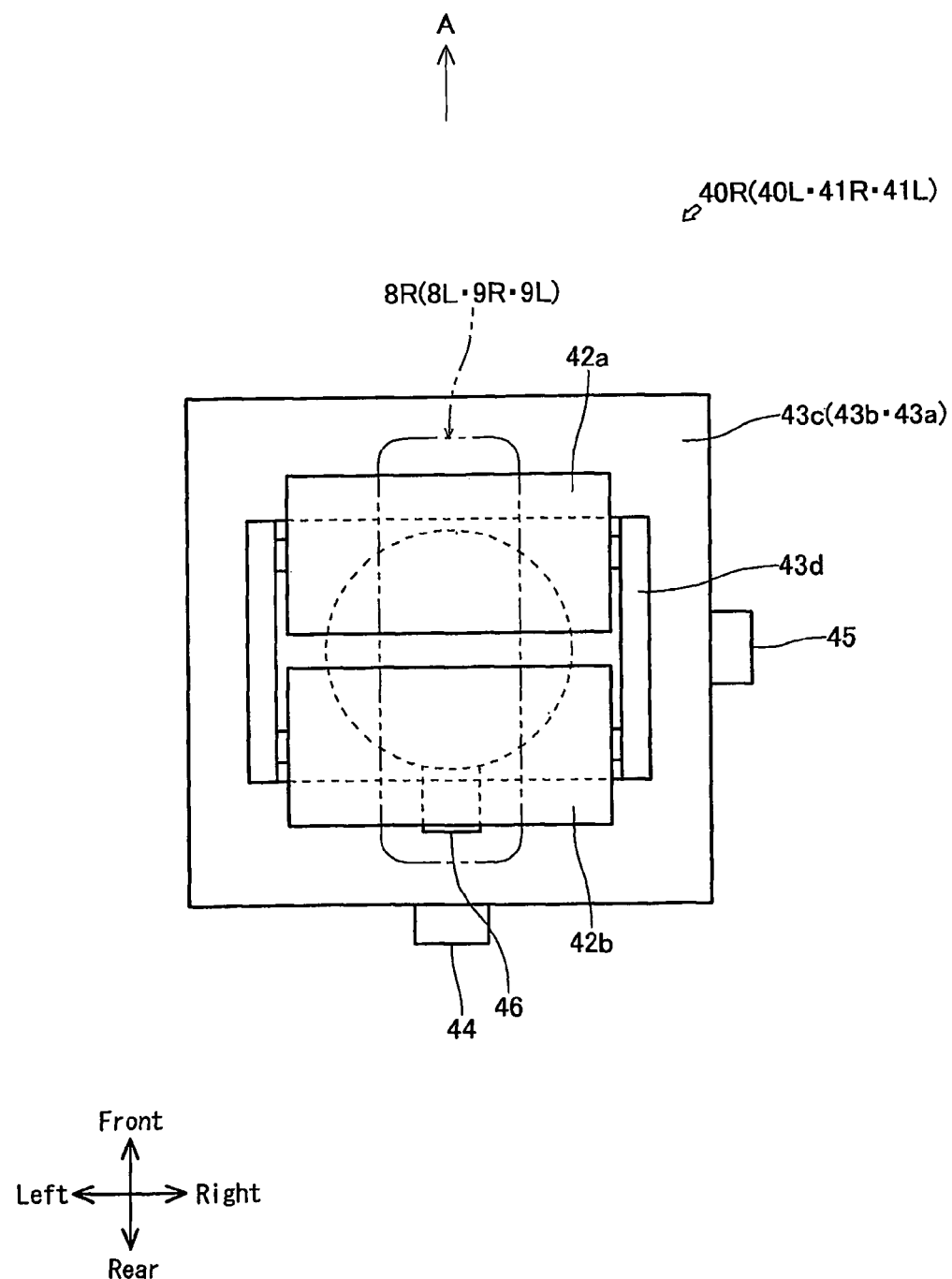
FIG. 6 is a plan view of a run-out-type confronting device.
Figure 7:
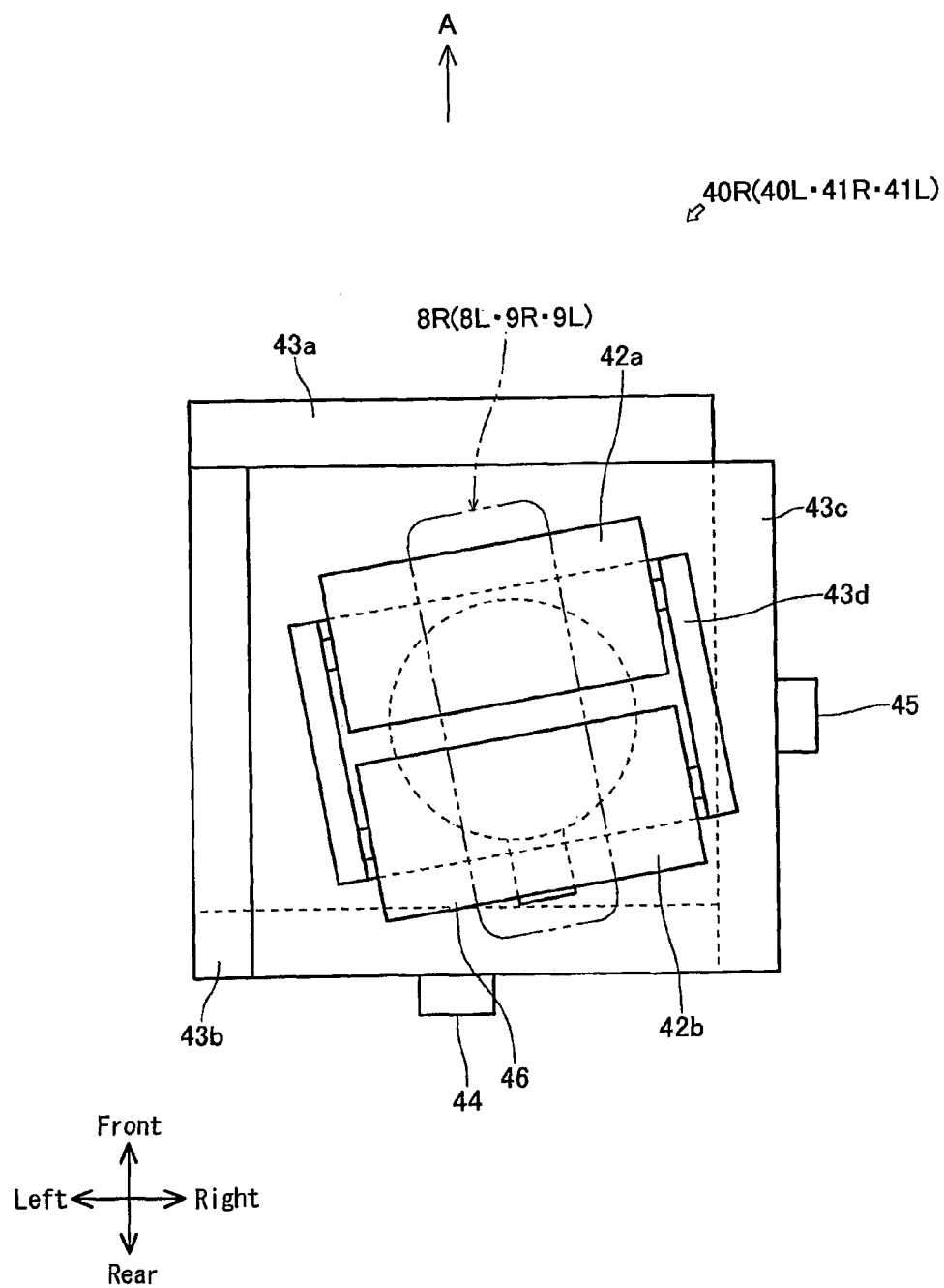
FIG. 7 is a plan view of the run-out-type confronting device when rollers are moving in the fore-and-aft and right-and-left directions and are turning.

As shown in FIG. 2, FIG. 6, and FIG. 7, the table 43 has a first support 43a, a second support 43b, a third support 43c, and a fourth support 43d.

The first support 43a, which is movable in longitudinal and crosswise directions by an actuator (not shown), such as a hydraulic cylinder, serves as a bottom portion of the table 43. By operating the actuator, the run-out-type confronting unit 40R can be moved to the underlying position of the right front wheel 8R of the passenger car 7 positioned at the confronting position in correspondence to a type of the car entering the vehicle confronting apparatus The second support 43b is disposed above the first support 43a, and is engaged with the first support 43a slidably in the longitudinal direction through a linear guide (not illustrated).

The third support 43c is disposed above the second support 43b, and is engaged with the second support 43a slidably in crosswise direction through a linear guide not illustrated.

The fourth support 43d is disposed above the third support 43c, and is turnably supported by the third support 43c through a bearing (not illustrated).

The term "turn (turnably)" means "rotate" or "pivot" around a substantially vertical axis.

The rollers 42a, 42b are turnably supported by an upper portion of the fourth support 43d.

As shown in FIG. 6 and FIG. 7, the second support 43'b, the third support 43c, the fourth support 43d, and rollers 42a, 42b move integrally in the longitudinal direction relative to the first support 43a when the second support 43b moves in the longitudinal direction relative to the first support 43a.

The third support 43c, the fourth support 43d, and rollers 42a, 42b move integrally in the crosswise direction relative to the second support 43b when the third support 43c moves in the crosswise direction relative to the second support 43b.

The fourth support 43d, and rollers 42a, 42b turn integrally relative to the third support 43c when the fourth support 43d turns relative to the third support 43c.

In this way, the table 43 can support the roller 42a, 42b movably in the longitudinal and crosswise directions and turnably As shown in FIG. 2, the longitudinal move-restraining member 44 is one of embodiments of a longitudinal move-restraining means of the invention. The longitudinal move-restraining member 44 restrains the longitudinal moving of the rollers 42a, 42b, or cancels the restriction.

The term "restriction of the longitudinal movement of a rotating member" means to keep the rotating member immovable in longitudinal direction. The term "cancel the restriction of the longitudinal movement of a rotating member" means to keep the rotating member movable in longitudinal direction.

As shown in FIG. 6, the slide of the second support 43b in the longitudinal direction relative to the first support 43a is restricted when the longitudinal move-restraining member 44 engages with the first support 43a and the second support 43b of the table 43.

As shown in FIG. 7, the slide of the second support 43b in longitudinal direction relative to the first support 43a is allowed when the longitudinal move-restraining member 44 is disengaged from the first support 43a and the second support 43b of the table 43.

As shown in FIG. 2, the crosswise move-restraining member 45 is one of embodiments of a crosswise move-restraining means of the invention. The crosswise move-restraining member 45 restrains the crosswise moving of the rollers 42a, 42b, or cancels the restriction.

The term "restriction of the crosswise movement of a rotating member" means to keep the rotating member immovable in the crosswise direction. The term "cancel the restriction of the crosswise movement of a rotating member" means to keep the rotating member movable in the crosswise direction.

As shown in FIG. 6, the slide of the third support 43c in the crosswise direction relative to the second support 43b is restricted when the crosswise move-restraining member 45 engages with the second support 43b and the third support 43c of the table 43.

As shown in FIG. 7, the slide of the third support 43c in the crosswise direction relative to the second support 43b is allowed when the crosswise move-restraining member 45 is disengaged from the second support 43b and the third support 43c of the table 43.

As shown in FIG. 2, the turn-restraining member 46 is one of embodiments of a turn-restraining means of the invention. The turn-restraining member 46 restrains the turn of the rollers 42a, 42b, or cancels the turn.

The term "restriction of the turn of a rotating member" means to keep the rotating member not-turnable. The term "cancel the restriction of the turn of a rotating member" means to keep the rotating member turnable.

As shown in FIG. 6, the turn of the fourth support 43d relative to the third support 43c is restricted when the turn-restraining member 46 engages with the third support 43a and the fourth support 43d of the table 43.

As shown in FIG. 7, the turn of the fourth support 43d relative to the third support 43c is allowed when the turn-restraining member 46 is disengaged from the third support 43a and the fourth support 43d of the table 43.

In the following, the control device 6 is described by referring FIG. 1.

The control device 6 is one of the embodiments of a control means of the invention, and controls the guide-type confronting device 2 and the run-out-type confronting device 4.

The control device 6 mainly has a control part 61, an input part 62, and a displaying part 63.

Substantively, the control part 61 has: a storage means, which stores a program for controlling the motions of the guide-type confronting device 2 (a motion control program for guide-type confronting device), a program for controlling the motions of the run-out-type confronting device 4 (a motion control program for run-out-type confronting device), a program for integrating (synchronizing) the motions of the guide-type confronting device 2 and the run-out-type confronting device 4; an expansion means for expanding these programs and the like; an operating means to conduct predetermined operation according to these programs or the like; a memory means to memorize various data and the like; and so on.

More specifically, the control part 61 can be composed of CPU, ROM, RAM, HDD or the like, connected with buses, or be composed of one-chip LSI or the like.

The control part 61 can be composed for exclusive use, or alternatively, it can be composed of a commercial personal computer, or a work station, etc.

The control part 61 is connected to the motors 30a, 30b of each of the guide-type confronting units 20R, 20L, 21R, and 21L of the guide-type confronting device 2 and others, so as to transmit the signals for motions of the guide-type confronting device 2.

The control part 61 is connected to the sensors 22a, 22b of the guide-type confronting device 2 for detecting a passing of the front wheels, and is able to acquire the information, relating to the passing of the right front wheel 8R and the left front wheel 8L, acquired by the sensors 22a, 22b.

The control part 61 is connected to the actuators (not illustrated), such as hydraulic cylinders, for moving the run-out-type confronting units 40R, 40L, 41R, and 41L of the run-out-type confronting devise 4 in longitudinal and crosswise directions in correspondence to different confronting positions for every type of the vehicle, is connected to the motors (not illustrated) for rotationally driving the rollers 42a, 42b of each of the run-out-type confronting units 40R, 40L, 41R, and 41L, and is connected to the actuators (not illustrated), such as hydraulic cylinders, for moving the longitudinal move-restraining member 44, the crosswise move-restraining member 45, the turn-restraining member 46, so as to transmit the signals for motions of the run-out-type confronting devise 4.

The input part 62 is a device for an operator to input data or the like, which relates to the motion of the vehicle confronting apparatus 1 (for instance kinds of a passenger car 7 and a production number for each passenger car 7, etc.), to the control part 61.

The input part 62 can be composed for exclusive use, or alternatively, it can be composed of a commercial keyboard, or a touch panel, etc.

The displaying part 63 displays the data inputted from the input part 62, and operating conditions of the vehicle confronting apparatus 1, etc.

The displaying part 63 can be composed for exclusive use, or alternatively, it can be composed of a commercial monitor, or a liquid crystal display, etc.

In the following, an embodiment of the confronting method for a vehicle of the invention is descried by referring FIG. 8 to 10.

Figure 8:
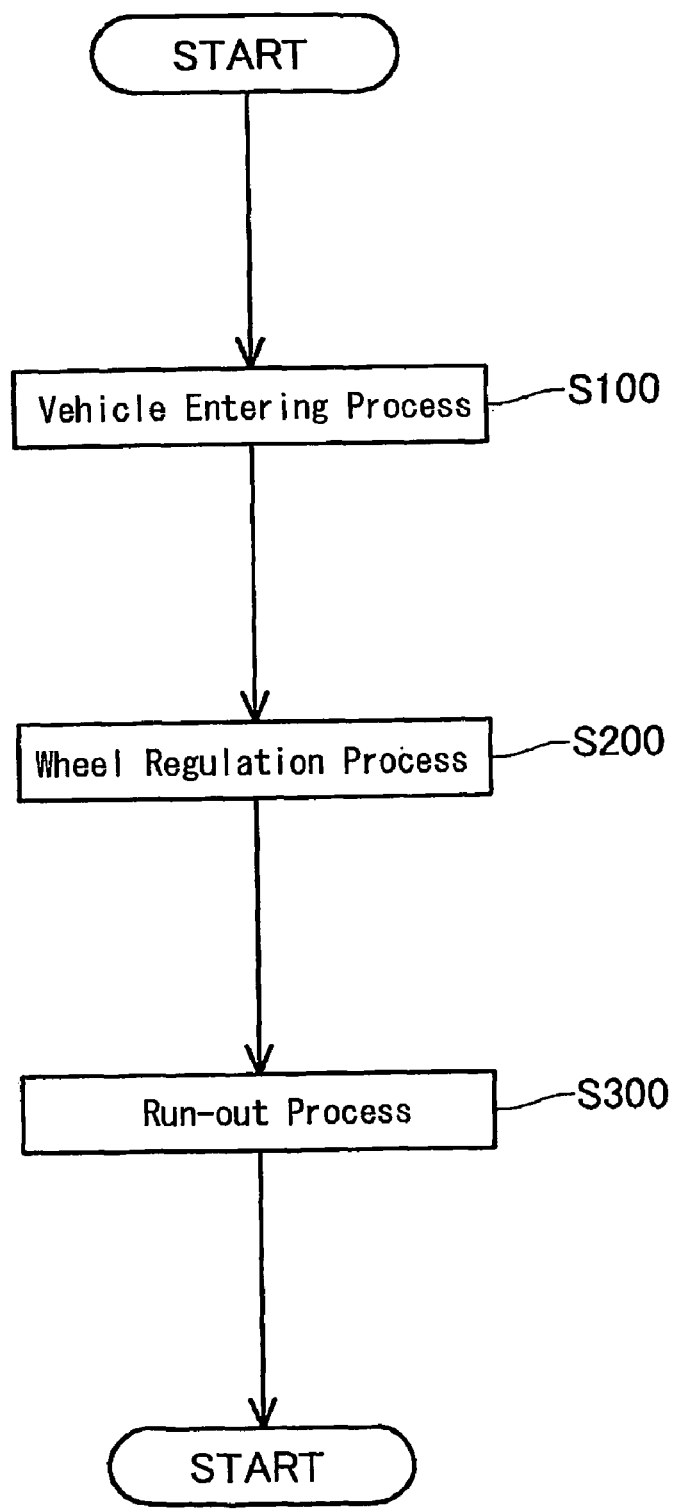
FIG. 8 is a flowchart of a confronting method for a vehicle according to an embodiment of the invention.

As shown in FIG. 8, the embodiment of the confronting method for a vehicle of the invention is a method to confront the passenger car 7 by using the vehicle confronting apparatus 1. This method mainly includes a vehicle entering process S100, a wheel regulation process S200, a run-out process S300, etc.

The vehicle entering process S100 is one of embodiments of the vehicle entering process of the invention, and in this process, the wheels of the passenger car 7 (the right front wheel 8R, the left front wheel 8L, the right rear wheel 9R, and the left rear wheel 9L) are guided, and the passenger car 7 is entered to the confronting position.

Figure 9:
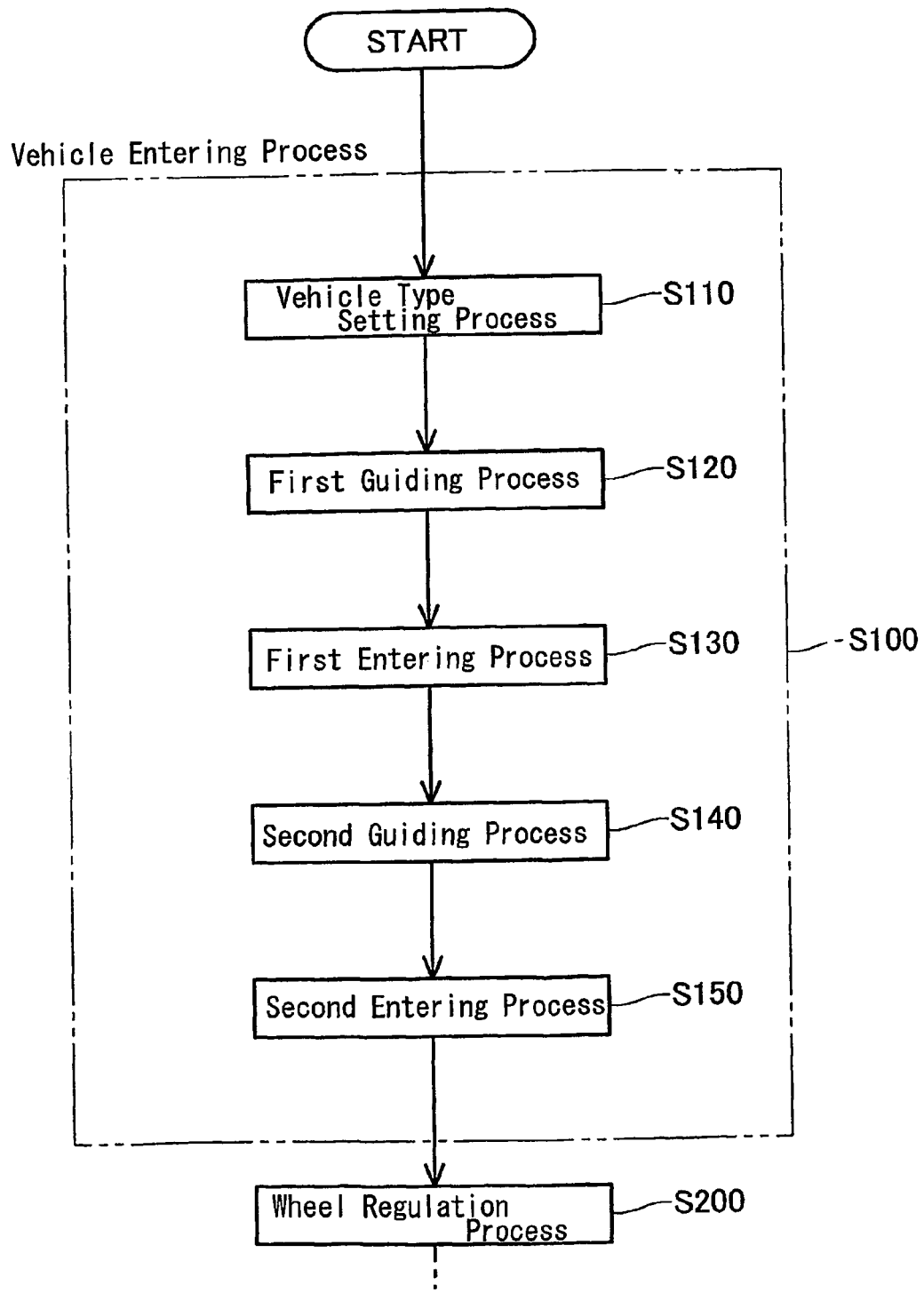
FIG. 9 is a detailed flowchart of a vehicle entering process in the confronting method for a vehicle according to the embodiment of the invention.

As shown in FIG. 9, the vehicle entering process S100 mainly has a vehicle type setting process S110, a first guiding process S120, a first entering process S130, a second guiding process S140, and a second entering process S150.

The vehicle type setting process S110 is a process to set up the type of the passenger car 7 (type of vehicle) to be confronted by the vehicle confronting apparatus 1.

In the vehicle type setting process S110, an operator inputs the type of the passenger car 7 by using the input part 62. The inputted type of the passenger car 7 is memorized in the control part 61.

Incidentally, the kind of vehicle is inputted by an operator in this embodiment. Alternatively, the kind of vehicle can be set up by reading an IC tag or the like, that memorizes the kind of the vehicle and is put on the vehicle.

Moreover, the vehicle type setting process S110 is omitted when only one kind of vehicle is provided.

The first guiding process S120 is performed subsequently to finishing of the vehicle type setting process S110.

The first guiding process S120 is a process to move the inner guide members 23a and the outer guide members 23b of the guide-type confronting device 2 toward "the first guide position" in correspondence to the type of vehicle set in the vehicle type setting process S110, and to move the run-out-type confronting units 40R, 40L, 41R, and 41L of the run-out-type confronting device 4 toward the initial position, respectively.

In the first guiding process S120, the control part 61 moves the positions of the inner guide members 23a and the outer guide members 23b toward "the first guide position" for each of the guide-type confronting units 20R, 20L, 21R, and 21L respectively according to the information concerning the set type of vehicle in the vehicle type setting process S110, and the information previously memorized in the memory means concerning the tread of each type of vehicle (the distance between the right and left wheels).

As to the inner guide member 23a of each of the guide-type confronting units 20R, 20L, 21R, and 21L, "the first guide position" is defined as the position having a predetermined space from the inner side of the front wheels (the right front wheel 8R and the left front wheel 8L) of the passenger car 7 entering straightforwardly toward in the confronting position. As to the outer guide member 23b of each of the guide-type confronting units 20R, 20L, 21R, and 21L, "the first guide position" is defined as the position having a predetermined space from the outer side of the front wheels (the right front wheel 8R and the left front wheel 8L) of the passenger car 7 entering straightforwardly toward in the confronting position.

Moreover, the control part 61 moves the run-out-type confronting units 40R, 40L, 41R, and 41L of the run-out-type confronting device 4 toward the initial position respectively according to the information concerning the type of vehicle set in the vehicle type setting process S110, the information that is memorized in the memory means beforehand concerning the tread (the distance between the right and left wheels) and wheelbases (the distance between the front and rear wheels) of each type of vehicle.

The first entering process S130 is performed subsequently to finishing of the first guiding process S120.

The first entering process S130 is a process to enter the passenger car 7 forward in the vehicle confronting apparatus 1 so as to pass the right front wheel 8R between the inner guide member 23a and outer guide member 23b of the guide-type confronting unit 21R, and so as to pass the left front wheel 8L between the inner guide member 23a and outer guide member 23b of the guide-type confronting unit 21L, respectively.

In the first entering process S130, by an operator riding on the passenger car 7, the passage car 7 travels forward in the vehicle confronting apparatus 1 so as to pass the right front wheel 8R between the inner guide member 23a and outer guide member 23b of the guide-type confronting unit 21R, and so as to pass the left front wheel 8L between the inner guide member 23a and outer guide member 23b of the guide-type confronting unit 21L.

The sensors 22a, 22b for detecting a passing of the front wheels detect the passing of the front wheels of the passenger car 7 (the right front wheel 8R, the left front wheel 8L) when the front wheels of the passenger car 7 (the right front wheel 8R, the left front wheel 8L) having passed the guide-type confronting units 21R, 21L, and passed the optical axis of the sensors 22a, 22b.

A buzzer (not illustrated) beeps when the sensors 22a, 22b detect the passing of the front wheels (the right front wheel 8R, the left front wheel 8L), so that the operator hearing the beeps stops the passenger car 7 temporarily.

At this moment, the rear wheels of the passenger car 7 (the right rear wheel 9R, the left rear wheel 9L) do not have reached the guide-type confronting unit 21R, 21L yet.

The second guiding process S140 is performed subsequently to finishing of the first entering process S130.

The second guiding process S140 is a process to move the inner guide members 23a and the outer guide members 23b of the guide-type confronting device 2 to "the second guide position" in correspondence to the type of vehicle set in the vehicle type setting process S110

In the second guiding process S140, the control part 61 moves the positions of the inner guide members 23a and the outer guide members 23b to "the second guide position" for each guide-type confronting units 21R, 21L respectively according to the information concerning the type of vehicle inputted in the vehicle type setting process S110, and the information that is memorized in the memory means beforehand concerning the tread of each type of vehicle (the distance between the right and left wheels).

As to the inner guide member 23a of each of the guide-type confronting units 21R, 21L, "the second guide position" is defined as the position having a predetermined space from the inner side of the rear wheels (the right rear wheel 9R and the rear front wheel 9L) of the passenger car 7 entering straightforwardly toward in the confronting position. As to the outer guide member 23b of each of the guide-type confronting units 21R, 21L, "the second guide position" is defined as the position having a predetermined space from the outer side of the rear wheels (the right rear wheel 9R and the left rear wheel 9L) of the passenger car 7 entering straightforwardly toward the confronting position.

The second entering process S150 is performed subsequently to finishing of the second guiding process S140.

The second entering process S150 is a process to enter the passenger car 7 forward in the vehicle confronting apparatus 1 so as to pass the right front wheel 8R between the inner guide member 23a and outer guide member 23b of the guide-type confronting unit 20R, so as to pass the left front wheel 8L between the inner guide member 23a and outer guide member 23b of the guide-type confronting unit 20L, so as to pass the right rear wheel 9R between the inner guide member 23a and outer guide member 23b of the guide-type confronting unit 21R, and so as to pass the left rear wheel 9L between the inner guide member 23a and outer guide member 23b of the guide-type confronting unit 21L, respectively.

In the second entering process S150, by the operator riding on the passenger car 7, the passenger car 7 travels forward in the vehicle confronting apparatus 1 so as to pass the right front wheel 8R between the inner guide member 23a and outer guide member 23b of the guide-type confronting unit 20R, so as to pass the left front wheel 8L between the inner guide member 23a and outer guide member 23b of the guide-type confronting unit 20L, so as to pass the right rear wheel 9R between the inner guide member 23a and outer guide member 23b of the guide-type confronting unit 21R, and so as to pass the left rear wheel 9L between the inner guide member 23a and outer guide member 23b of the guide-type confronting unit 21L, respectively.

Each of the right front wheel 8R, the left front wheel 8L, the right rear wheel 9R, and left rear wheel 9L fits in the hollow formed at the gap between the rollers 42a, 42b of each of the run-out-type confronting units 40R, 40L, 41L, and 41R when the passenger car 7 reaches the confronting position. At this timing, the operator stops the passenger car 7.

Incidentally, in case that all the front and rear wheels have the same width and tread, the second guide process S140 and the second entering process S150 can be omitted.

The vehicle entering process S100 ends according to finishing of the second entering process S150.

The wheel regulation process S200 is performed subsequently to finishing of the vehicle entering process S100.

The wheel regulation process S200 is one of embodiments of the wheel regulation process of the invention, to regulate both sides of each of the wheels (the right front wheel 8R, the left front wheel 8L, the right rear wheel 9R, and the left rear wheel 9L) of the passenger car 7 reaching the confronting position.

In the wheel regulation process S200, the interval between the inner guide member 23a and the outer guide member 23b of each of the guide-type confronting units 20R, 20L, 21R, and 21L is narrowed respectively. As a result, each of the right front wheel 8R, the left front wheel 8L, the right rear wheel 9R, and the left rear wheel 9L is pushed and moved by the inner guide member 23a or the outer guide member 23b when the wheel is placed outside of the substantially center space that is formed between the inner guide member 23a and the outer guide member 23b.

The run-out process S300 is performed subsequently to finishing of the wheel regulation process S200.

The run-out process S300 is one of embodiments of the run-out process of the invention, to drive the wheels (the right front wheel 8R, the left front wheel 8L, the right rear wheel 9R, and the left rear wheel 9L) of the passenger car 7 reaching the confronting position.

Figure 10:
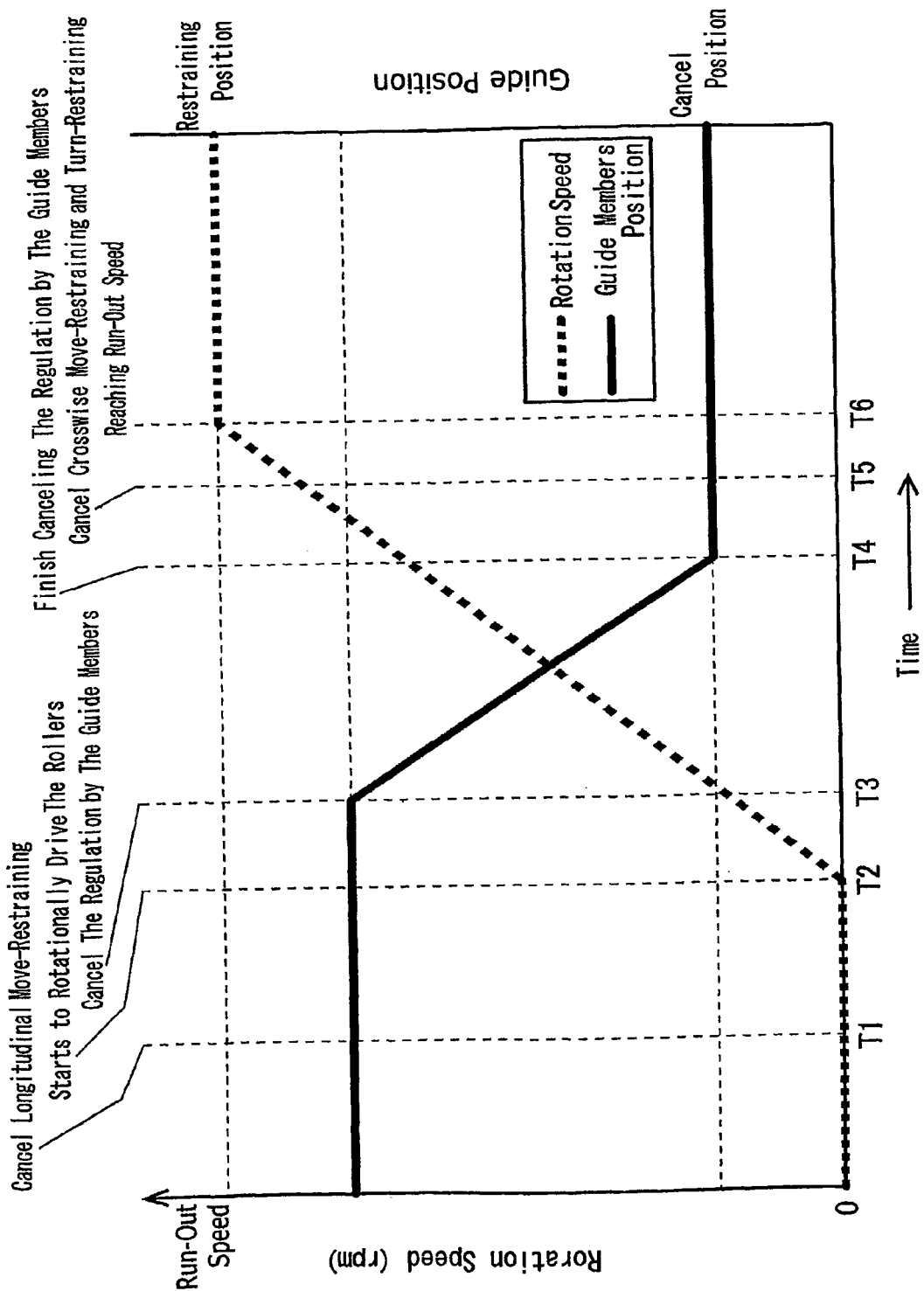
FIG. 10 is a control flowchart of a run-out process in the confronting method for a vehicle according to the embodiment of the invention.

As shown in FIG. 8 and FIG. 10, in the run-out process S300, the control part 61 controls the motions of the guide-type confronting device 2 and the run-out-type confronting device 4 as the following steps.

First of all, the restriction of longitudinal movement of the rollers 42a, 42b by the longitudinal move-restraining member 44 is canceled for each of the run-out confronting units 40R, 40L, 41R, and 41L (Time T1).

As a result, due to the self-weight of the passenger car 7, the rollers 42a, 42b of each of the run-out confronting units 40R, 40L, 41R, and 41L move conveniently for removing a part (especially, a longitudinal element) of the elastic deformation remaining in the wheels (the right front wheel 8R, the left front wheel 8L, the right rear wheel 9R, and the left rear wheel 9L) and a part (especially, a longitudinal element) of the hysteresis remaining in the undercarriage of the vehicle.

Next, the control part 61 starts to rotationally drive each of the rollers 42a, 42b of the run-out confronting units 40R, 40L, 41R, and 41L, and accelerates the rotation speed of the rollers gradually (Time T2).

During this period, each wheel (the right front wheel 8R, the left front wheel 8L, the right rear wheel 9R, or the left rear wheel 9L) regulated by each of the guide-type confronting unit 20R, 20L, 21R, and 21L can be prevented from being swung widely by the shock generated by the rollers 42a, 42b when the rotation of the rollers 42a, 42b is started.

Next, the control part 61 increases the width of the gap between the inner guide member 23a and the outer guide member 23b for each of the guide-type confronting units 20R, 20L, 21R, and 21L, so as to start canceling the regulation of the wheels (the right front wheel 8R, the left front wheel 8L, the right rear wheel 9R, and the left rear wheel 9L) (Time T3).

Next, the control part 61 increases the width of the gap between the inner guide member 23a and the outer guide member 23b for each of the guide-type confronting units 20R, 20L, 21R, and 21L, and finishes canceling the regulation of the wheels (the right front wheel 8R, the left front wheel 8L, the right rear wheel 9R, and the left rear wheel 9L) when the increased width of the gap between the inner guide member 23a and outer guide member 23b becomes a predetermined value (that is, the gap becomes wide enough relative to the width of the wheels) (Time T4).

Incidentally, during this period, the rotation speed of the rollers 42a, 42b is increased before the speed of wheels (the right front wheel 8R, the left front wheel 8L, the right rear wheel 9R, and the left rear wheel 9L) reaches the predetermined run-out speed.

Next, the control part 61 cancels the restriction of the movement of the rollers 42a, 42b by the crosswise move-restraining member 45 for each of the run-out confronting units 40R, 40L, 41R, and 41L, and cancels the restriction of the turn of the rollers 42a, 42b by the turn-restraining member (Time T5).

Next, the control part 61 stops the acceleration of the rollers 42a, 42b when the rotation speed of the wheels (the right front wheel 8R, the left front wheel 8L, the right rear wheel 9R, and the left rear wheel 9L) reaches the predetermined run-out speed (Time T6).

After that, the rotation speed of the rollers 42a, 42b is kept constant during the predetermined run-out time, then, the rotation speed of the rollers 42a, 42b is decreased gradually, and finally the rotational driving of the roller 42a, 42b is stopped.

In the status that the rotation speed of the rollers is kept constant during the predetermined run-out time, the fore-and-aft and left-and-right movement and the turn of the rollers 42a, 42b are allowed, and the wheels (the right front wheel 8R, the left front wheel 8L, the right rear wheel 9R, and the left rear wheel 9L) are driven rotationally.

Thus, due to the self-weight of the passenger car 7, the elastic deformation remaining in the wheels (the right front wheel 8R, the left front wheel 8L, the right rear wheel 9R, and the left rear wheel 9L) are removed, and hysteresis remaining in the undercarriage of the vehicle are removed.

Further, the wheels (the right front wheel 8R, the left front wheel 8L, the right rear wheel 9R, and the left rear wheel 9L) are regulated by the guide-type conforming unit 20R, 20L, 21R, and 21L, and are placed in the confronting position before they are rotationally driven and for a while they are rotationally driven (for the period between Time T2 and Time T3).

Therefore, it takes a short time to place the vehicle at the confronting position under the situation that the wheels (the right front wheel 8R, the left front wheel 8L, the right rear wheel 9R, and the left rear wheel 9L) are released from the elastic deformation and the undercarriage of the car is released from the hysteresis.

Incidentally, in this embodiment, the regulation of the crosswise movement of the rollers 42a, 42b by the crosswise move-restraining member 45 and the turn of the rollers 42a, 42b by the turn restraining member 46 are canceled within the period between the time of finishing canceling the restriction of the wheels (the right front wheel 8R, the left front wheel 8L, the right rear wheel 9R, and the left rear wheel 9L) and the time of the rotation speed of the wheels (the right front wheel 8R, the left front wheel 8L, the right rear wheel 9R, and the left rear wheel 9L) reaching the predetermined speed (from Time T4 to Time T6). However, the vehicle confronting apparatus and the confronting method for a vehicle of the invention are not restricted to the present embodiment. That is, it is also acceptable that, after the rotation speed of the wheels (the right front wheel 8R, the left front wheel 8L, the right rear wheel 9R, and the left rear wheel 9L) reaches the predetermined speed (after time T6), the restriction of the crosswise movement of the rollers 42a, 42b by the crosswise move-restraining member 45 is canceled, and the restriction of the turn of the rollers 42a, 42b by the turn restraining member 46 is canceled.

Moreover, in this embodiment, the restriction of the crosswise movement of the rollers 42a, 42b by the crosswise move-restraining member 45 is canceled simultaneously with the cancellation of the turn of the rollers 42a, 42b by the turn restraining member 46. However, the vehicle confronting apparatus and the confronting method for a vehicle of the invention are not restricted to the present embodiment. That is, it is also acceptable that the restriction of the crosswise movement of the rollers 42a, 42b by the crosswise move-restraining member 45 can be canceled earlier or later than the cancellation of the turn of the rollers 42a, 42b by the turn restraining member 46.

As explained above, the vehicle confronting apparatus 1 according to an embodiment of the invention comprises: the guide-type confronting device 2; the run-out-type confronting device 4; and the control device 6. The guide-type confronting device 2 guides a wheel (any of the right front wheel 8R, the left front wheel 8L, the right rear wheel 9R, and the left rear wheel 9L) of the passenger car 7 entering to the confronting position, and regulates both sides of the wheel (the right front wheel 8R, the left front wheel 8L, the right rear wheel 9R, or the left rear wheel 9L) of the passenger car 7. The run-out-type confronting device 4 rotationally drives the wheel (the right front wheel 8R, the left front wheel 8L, the right rear wheel 9R, or the left rear wheel 9L) of the passenger car 7 reaching the confronting position. The control device 6 controls the motions of the guide-type confronting device 2 and the run-out-type confronting device 4. The control device 6 cancels the regulation of the wheel (the right front wheel 8R, the left front wheel 8L, the right rear wheel 9R, or the left rear wheel 9L) by the guide-type confronting device 2 within a period between the time of starting of the rotational driving of the wheel (the right front wheel 8R, the left front wheel 8L, the right rear wheel 9R, or the left rear wheel 9L) of the passenger car 7 and the time when the rotation speed of the wheel (the right front wheel 8R, the left front wheel 8L, the right rear wheel 9R, or the left rear wheel 9L) reaches a predetermined run-out speed.

Therefore, the passenger car 7 can be confronted in short time and certainly (in the situation that the elastic deformation remaining the wheel and hysteresis remaining in the undercarriage of the car are removed in short time).

Further, the run-out-type confronting device 4 (each of the run-out-type confronting units 40R, 40L, 41R, and, 41L), comprises: the rollers 42a, 42b; the table 43; the longitudinal move-restraining member 44; the crosswise move-restraining member 45; and the turn-restraining member 46. The rollers 42a, 42b abut against the wheel (the right front wheel 8R, the left front wheel 8L, the right rear wheel 9R, or the left rear wheel 9L) so as to rotationally drive the wheel (the right front wheel 8R, the left front wheel 8L, the right rear wheel 9R, or the left rear wheel 9L) of the passenger car 7. The table 43 supports the roller 42a, 42b movably in longitudinal and crosswise directions and turnably. The longitudinal move-restraining member 44 restricts the longitudinal moving of the rollers 42a, 42b, or cancels the restriction. The crosswise move-restraining member 45 restricts the crosswise moving of the rollers 42a, 42b, or cancels the restriction. The turn-restraining member 46 restricts the turning of the rollers 42a, 42b, or cancels the restriction. The control device 6 cancels the restriction of the longitudinal moving of the rollers 42a, 42b by the longitudinal move-restraining member 44 before the rotational driving of the wheel (the right front wheel 8R, the left front wheel 8L, the right rear wheel 9R, or the left rear wheel 9L) of the passenger car 7 by the run-out-type confronting device 4 is started. The control device 6 cancels the restriction of the crosswise moving of the rollers 42a, 42b by the crosswise move-restraining member 45 and the restriction of the turning of the rollers 42a, 42b by the turn-restraining member 46 after the restriction of the wheel (the right front wheel 8R, the left front wheel 8L, the right rear wheel 9R, or the left rear wheel 9L) of the passenger car 7 by the guide-type confronting device 2 is canceled.

Therefore, the passenger car 7 can be confronted in short time and certainly (in the situation that the elastic deformation remaining the wheel and hysteresis remaining in the undercarriage of the car are removed in short time).

Moreover, the confronting method for a vehicle according to an embodiment of the invention comprises: the vehicle entering process S100; the wheel restriction process S200; and the run-out process S300. The vehicle entering process S100 is performed to guide a wheel (any of the right front wheel 8R, the left front wheel 8L, the right rear wheel 9R, and the left rear wheel 9L) of the passenger car 7, and to enter the passenger car 7 to the confronting position. The wheel restriction process S200 is performed to regulate both sides the wheel (the right front wheel 8R, the left front wheel 8L, the right rear wheel 9R, or the left rear wheel 9L) of the passenger car 7 reaching the confronting position. The run-out process S300 is performed to rotationally drive the wheel (the right front wheel 8R, the left front wheel 8L, the right rear wheel 9R, or the left rear wheel 9L) of the passenger car 7 reaching the confronting position. During the run-out process S300, the restriction of the wheel (the right front wheel 8R, the left front wheel 8L, the right rear wheel 9R, or the left rear wheel 9L) is canceled within a period between the time of starting of the rotational driving of the wheel (the right front wheel 8R, the left front wheel 8L, the right rear wheel 9R, or the left rear wheel 9L) of the passenger car 7 and the time when the rotation speed of the wheel (the right front wheel 8R, the left front wheel 8L, the right rear wheel 9R, or the left rear wheel 9L) reaches a predetermined run-out speed.

Therefore, the passenger car 7 can be confronted in short time and certainly (with in the situation that the elastic deformation remaining the wheel and hysteresis remaining in the undercarriage of the car are removed in short time).

Moreover, in the confronting method for a vehicle according to the embodiment of the invention, the run-out process S300 is performed using the run-out-type confronting device 4. The run-out-type confronting device 4 comprises: the rollers 42a, 42b; the rollers 42a, 42b; the table 43; the longitudinal move-restraining member 44; the crosswise move-restraining member 45; and the turn-restraining member 46. The rollers 42a, 42b abut against the wheel (the right front wheel 8R, the left front wheel 8L, the right rear wheel 9R, or the left rear wheel 9L) so as to rotationally drive the wheel (the right front wheel 8R, the left front wheel 8L, the right rear wheel 9R, or the left rear wheel 9L) of the passenger car 7. The table 43 supports the roller 42a, 42b movably in longitudinal and crosswise directions and turnably. The longitudinal move-restraining member 44 restricts the longitudinal moving of the rollers 42a, 42b, or cancels the restriction. The crosswise move-restraining member 45 restricts the crosswise moving of the rollers 42a, 42b, or cancels the restriction. The turn-restraining member 46 restricts the turning of the rollers 42a, 42b, or cancels the restriction. The restriction of the longitudinal moving of the rollers 42a, 42b by the longitudinal move-restraining member 44 is canceled before the rotational driving of the wheel (the right front wheel 8R, the left front wheel 8L, the right rear wheel 9R, or the left rear wheel 9L) of the passenger car 7 by the run-out-type confronting device 4 is started. The restriction of the crosswise moving of the rollers 42a, 42b by the crosswise move-restraining member 45, and the restriction of the turning of the rollers 42a, 42b by the turn-restraining member 46 is canceled after the restriction of the wheel (the right front wheel 8R, the left front wheel 8L, the right rear wheel 9R, and the left rear wheel 9L) of the passenger car 7 by the guide-type confronting device 2 is canceled.

Therefore, the passenger car 7 can be confronted in short time and certainly (with in the situation that the elastic deformation remaining the wheel and hysteresis remaining in the undercarriage of the car are removed in short time).

INDUSTRIAL APPLICABILITY

The invention may also be used widely as a confronting device for any travelable "Vehicle" that has wheels, such as a track, a trailer or various work vehicles.

1 Vehicle Confronting Apparatus
2 Guide-Type Confronting Device
4 Run-Out-Type Confronting Device
6 Control Device
7 Passenger Car
8R Right Front Wheel
8L Left Front Wheel
9R Right Rear Wheel
9L Left Rear Wheel

The invention claimed is:
1. A vehicle confronting apparatus comprising:
a guide-type confronting device guiding a wheel of a vehicle entering to a confronting position, and regulating both sides of the wheel of the vehicle;
a run-out-type confronting device rotationally driving the wheel of the vehicle reaching the confronting position; and
a control device controlling motions of the guide-type confronting device and the run-out-type confronting device,
wherein the control device cancels the regulation of the wheel by the guide-type confronting device within a period between a time of starting of the rotational driving of the wheel of the vehicle and a time when the rotation speed of the wheel reaches a predetermined run-out speed.
2. The vehicle confronting apparatus as set forth in claim 1, the run-out-type confronting device comprising:
a rotation means abutting against the wheel of the vehicle so as to rotationally drive the wheel;
a support means supporting the rotation means movably in longitudinal and crosswise directions and turnably;

a longitudinal move-restraining means to restrict the longitudinal moving of the rotation means, or to cancel the restriction;

a crosswise move-restraining means to restrict the crosswise moving of the rotation means, or to cancel the restriction; and a turn-restraining means to restrict the turning of the rotation means, or to cancel the restriction, wherein the control device cancels the restriction of the longitudinal moving of the rotation means by the longitudinal move-restraining means before the rotational driving of the wheel of the vehicle by the run-out-type confronting device is started, and wherein the control means cancels the crosswise restriction of the moving of the rotation means by the crosswise move-restraining means and the restriction of the turning of the rotation means by the turn-restraining means after the restriction of the wheel by the guide-type confronting device is canceled.

3. A confronting method for a vehicle comprising:

a vehicle entering process guiding a wheel of the vehicle, and entering the vehicle to a confronting position;

a wheel restriction process regulating both sides of the wheel of the vehicle reaching the confronting position; and a run-out process rotationally driving the wheel of the vehicle reaching the confronting position, wherein, during the run-out process, the restriction of the wheel is canceled within a period between a time of starting of the rotational driving of the wheel of the vehicle and a time when the rotation speed of the wheel reaches a predetermined run-out speed.

4. The confronting method for a vehicle as set forth in claim 3, wherein the run-out process is performed using a run-out-type confronting device, the run-out-type confronting device comprising:

a rotation means abutting against the wheel of the vehicle so as to rotationally drive the wheel;

a support means supporting the rotation means movably in longitudinal and crosswise directions and turnably;

a longitudinal move-restraining means to restrict the longitudinal moving of the rotation means, or to cancel the restriction; and a crosswise move-restraining means to restrict the crosswise moving of the rotation means, or to cancel the restriction; and a turn-restraining means to restrict the turning of the rotation means or to cancel the restrictions, wherein the restriction of the longitudinal moving of the rotation means by the longitudinal move-restraining means is cancelled before the rotational driving of the wheel of the vehicle by the run-out-type confronting device is started, and wherein the restriction of the crosswise moving of the rotation means by the crosswise move-restraining means and the restriction of the turning of the rotation means by the turn-restraining means are canceled after the restriction of the wheel by the guide-type confronting device is canceled.

* * * * *